United States Patent [19]
Jones

[11] 3,822,921
[45] July 9, 1974

[54] SLIP AND RAMP SIGNAL GENERATOR AND COMPARATOR FOR A VEHICLE SKID CONTROL BRAKING SYSTEM

[75] Inventor: James J. Jones, Plano, Tex.
[73] Assignee: Texas Instruments Incorporated, Dallas, Tex.
[22] Filed: July 17, 1972
[21] Appl. No.: 272,581

[52] U.S. Cl. .......... 303/21 BE, 303/20, 303/21 AF, 303/21 P
[51] Int. Cl. ............................................. B60t 8/10
[58] Field of Search .......... 188/181; 303/20, 21; 317/5; 324/161–162; 340/52 R, 53, 262–263

[56] References Cited
UNITED STATES PATENTS

| | | | |
|---|---|---|---|
| 3,578,819 | 5/1971 | Atkins | 303/21 BE |
| 3,604,760 | 9/1971 | Atkins | 303/21 CG |
| 3,612,622 | 10/1971 | Riordan | 303/21 P |
| 3,640,588 | 2/1972 | Carp et al. | 303/21 BE X |
| 3,650,575 | 3/1972 | Okamoto | 303/20 X |
| 3,663,070 | 5/1972 | Scharlack | 303/21 P |
| 3,701,569 | 10/1972 | Arai et al. | 303/21 BE |

Primary Examiner—Milton Buchler
Assistant Examiner—Stephen G. Kunin
Attorney, Agent, or Firm—Harold Levine; Edward J. Connors, Jr.; William E. Hiller

[57] ABSTRACT

Disclosed is a slip and ramp generator and comparator circuit for selectively activating a brake control mechanism to inhibit vehicle braking action in a vehicle skid control braking system. The disclosed circuit includes a slip signal generator responsive to a first signal representing vehicle wheel speed for selectively generating a slip signal proportional thereto, and a ramp signal generator proportional to the slip signal for generating a ramp signal representing vehicle land speed. The circuit also includes a comparator responsive to the first signal and to the ramp signal for selectively generating a gating signal indicative of the condition wherein vehicle wheel speed is less than vehicle land speed. Upon this condition the gating signal activates a brake control mechanism to inhibit vehicle braking action.

7 Claims, 5 Drawing Figures

3,822,921

SLIP AND RAMP SIGNAL GENERATOR AND COMPARATOR FOR A VEHICLE SKID CONTROL BRAKING SYSTEM

BACKGROUND INFORMATION

This invention relates to a vehicle skid control system wherein the vehicle brakes are subjected to a "pumping-type" or "pulse action" mode of operation by the system under certain operating conditions. More particularly, this invention concerns a sub-system of such a vehicle skid control system for inhibiting the braking action of the vehicle in a controlled manner.

When the operator of a land vehicle desires to stop his vehicle under emergency braking conditions or under adverse road conditions, a realistic probability exists that the land vehicle will undergo an uncontrolled skid, or a controllable skid which prevents the operator from bringing his land vehicle to a safe stop within the distance available. Under these circumstances, one factor that indicates an imminent skid is the relative relationship between vehicle wheel speed and vehicle speed. It has been readily accepted by safety experts and professional land vehicle drivers that vehicle stability can be achieved by automatically "pumping" or "pulsing" of the brakes associated with the wheels of the land vehicle in a pre-programmed manner dynamically related to the rate of acceleration and deceleration of the land vehicle.

In more recent times, several systems have been developed that operate on the principle of selectively inhibiting the normal braking action initiated by the operator of the land vehicle. In one of these systems, wheel speed sensors are utilized to generate A.C. signals that are proportional to vehicle wheel speed. The vehicle wheel speed signals are then processed through a control module which generates a D.C. voltage to energize a solenoid in an actuator that controls the hydraulic braking system to the vehicle wheels. When a skid is imminent, a command signal from the control module causes the actuator solenoid to close a vacuum passage in a diaphragm chamber. By action of the diaphragm and the normal hydraulic pressure from the master cylinder of the land vehicle braking system as developed by the operator thereof, the hydraulic pressure to the vehicle wheels is released, thereby inhibiting the vehicle wheel braking action. When the vehicle wheels spin up to the vehicle speed or to a selective lower speed, the control module produces a signal to deenergize the actuator solenoid. This in turn restores line pressure in the vehicle braking system and reapplies the vehicle brakes. In effect, what is achieved by this system is that the vehicle brakes are "pumped" or "pulsed" in a manner often recommended for controlled braking under adverse driving conditions.

The control module of the aforementioned system includes a frequency converter for each wheel speed sensor for converting a frequency varying signal into a varying direct current signal proportional thereto. A summation of the outputs from each of the frequency converters produces a composite of the vehicle wheel speed signals. Respective deceleration and acceleration rate detectors respond to the output of the summing amplifier for producing outputs proportional to the rate of deceleration and acceleration respectively of the wheels of the land vehicle. A signal proportional to the output of the summing amplifier is transferred to a vehicle velocity ramp generator and one input of an automatically adjustable switching circuit. The vehicle velocity ramp generator produces a step function ramp signal having an overall slope related to the actual speed of the land vehicle when braking to a stop. The automatically adjustable switching circuit also receives an input from the vehicle velocity ramp generator and an input from a retarding force detector, and produces an output whenever the summation of the wheel speed signal, the velocity ramp signal, and the retarding force signal reaches a first threshold condition. The retarding force detector produces an output signal which relates to the braking factors including tire condition, brake condition, and the condition of the road surface. To generate a control signal to the actuator solenoid, the output of the deceleration rate detector, the acceleration rate detector, and the automatically adjustable switching circuit must have a certain designated relationship. These three signals are the inputs to the brake controller as the last component in the control module.

A more detailed description of the features briefly stated above with regard to a prior known vehicle skid control system is set forth in a copending patent application, Ser. No. 25,131, filed Apr. 2, 1970, for "VEHICLE SKID CONTROL SYSTEM," which is assigned to the assignee of this application.

Another known and similar system that operates on the principle of inhibiting the normal braking action initiated by the operator of the land vehicle is set forth in U.S. Letters Pat. No. 3,578,819, issued May 18, 1971, for "SKID CONTROL SYSTEM," in the name of Thomas M. Atkins.

OBJECTIVES OF THE INVENTION

It is an object of the present invention to provide a slip and ramp generator and comparator circuit in a vehicle skid control braking system, responsive to a signal representing wheel speed of the vehicle for selectively generating an output signal indicative of the condition that vehicle wheel speed is less than vehicle land speed, which signal activates brake control means to inhibit vehicle braking action.

It is another object of the present invention to provide in a vehicle skid control braking system of the type that selectively controls engagment and disengagement of the braking system of a vehicle in accordance with selected braking conditions, a slip and ramp generator and comparator circuit for providing a signal which selectively activates a brake control means to inhibit vehicle braking action, comprising slip signal means responsive to a first signal representing vehicle wheel speed for selectively generating a slip signal proportional to the first signal; ramp signal means responsive to the slip signal for selectively generating a ramp signal representing vehicle land speed; and comparator means responsive to the first signal and to the ramp signal for generating a gate signal indicative of the condition that vehicle wheel speed is less than vehicle land speed, which activates brake control means to inhibit vehicle braking action.

It is still another object of the present invention to provide in a vehicle skid control braking system of the type that selectively controls engagement and disengagement of the braking system of the vehicle, a slip and ramp generator and comparator circuit comprising slip signal means responsive to a first signal representing wheel speed of the vehicle for selectively generating a slip signal proportional to the first signal; signal storage means for selectively storing the slip signal; charge control means responsive to first and second conditions of the wheels for selectively controlling the rate of discharge of the signal storage means and thereby generating a ramp signal representing vehicle land speed; and a comparator circuit responsive to the ramp signal and to the first signal for generating a gate signal indicative of the condition that vehicle wheel speed is less than vehicle land speed which causes release of the vehicle's brakes.

BRIEF DESCRIPTION OF THE INVENTION

An improved vehicle skid control system in which this invention is advantageously utilized includes a wheel sensor, which may be coupled to the wheels or to the drive shaft of the land vehicle and generates A.C. signals having a frequency varying in accordance with vehicle wheel speed A. These frequency varying signals A are coupled to a frequency converter that produces a D.C. output signal having a voltage magnitude that varies proportionally with the frequency of the A.C. signals generated by the speed sensor B. The varying D.C. wheel speed signals B generated by the frequency converter are coupled to a slip and ramp signal generator and comparator and to a D.C. level detector and zero velocity gate circuit.

The slip and ramp signal generator and comparator of this invention performs three basic functions: First, it modifies or offsets the varying D.C. wheel speed signals B coupled thereto by a predetermined percentage or value, which is referred to as the "slip" signal $C_1$; second, under the control of the slip signal $C_1$, it generates a ramp signal C having a programmable constant current rate of discharge representative of vehicle land speed; and third, it compares the ramp signal C and the varying D.C. signal B, and when vehicle wheel speed drops below the related vehicle land speed represented by the ramp signal exhibiting controlled rates of discharge, it generates a "slip" gate signal D. The slip gate signal D is then coupled to one of the inputs of a brake control logic circuit.

Fundamentally, the slip and ramp signal generator and comparator develops a "slip" signal D, which is a "turn on" gate signal for controlling the brake system of the land vehicle in dynamic proportion to the conditions developed by speed detection, and acceleration and deceleration detctor circuits. The brake system of the land vehicle is also controlled by the reset circuit. Thus, the brake system of the land vehicle is controlled, i.e., "turned on"or "turned off," dependent relative upon wheel speed acceleration rates and wheel velocity levels.

The brake control logic circuit in response to the presence of the several input gate signals applied thereto develops output signals which are respectively applied to the output driver circuit, to "turn on" or "turn off" the brake system of the land vehicle; to the slip and ramp signal generator, to set the slip and ramp and ramp signal generator, to set the slip and ramp signal generator and comparator and produce the slip gate signal D; and to the reset timer and gate circuit; to reset the skid control module for the succeeding cycle of operation.

Hereafter, the term vehicle land speed is understood to mean simulated actual vehicle land speed less a percentage value as generated by the slip divider 112, as shown in FIG. 3.

DETAILED DESCRIPTION - FIG. 1

Figure 1:
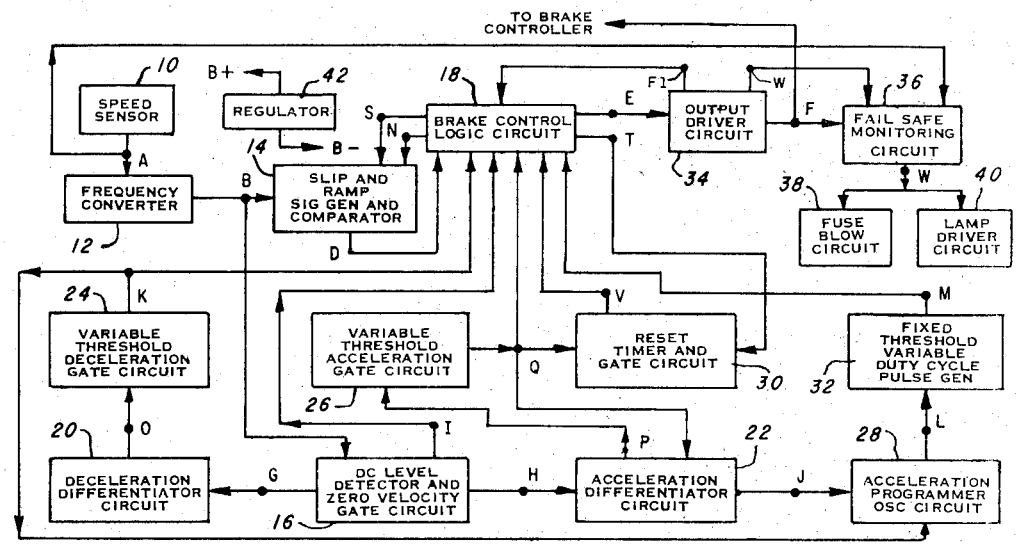
FIG. 1 is a block diagram of one embodiment of an improved vehicle skid control module for a vehicle skid control braking system.

Referring to the drawings, in FIG. 1 there is illustrated in block diagram format the components of one embodiment of a control module in a vehicle skid control braking system as described in detail in copending patent application, Ser. No. 266,798, filed June 27, 1972. The system includes a speed sensor 10 and a frequency converter 12. The speed sensor 10 is coupled to either the wheels or to the drive shaft of a land vehicle, e.g., electromagnetically, optically or mechanically, and generates a varying A.C. signal (A) which has frequency variations proportional to wheel speed. That is to say, the faster the wheel speed, the higher the frequency of the signal A connected to the frequency converter 12. The variable A.C. signals A generated by the speed sensor 10 are coupled to the frequency converter 12 wherein they are converted to a varying D.C. signal (B) having a D.C. magnitude proportional to vehicle wheel speed. The varying D.C. signal B generated by the frequency converter 12 is coupled to both the slip and ramp signal generator and comparator 14 and the D.C. level detector and zero velocity gate circuit 16.

The slip and ramp signal generator and comparator 14 modifies or offsets the varying D.C. signal B a preselected value and produces a "slip" signal ($C_1$), and then under the control of the slip signal $C_1$, it develops a ramp signal (C) having a dynamically programmable constant current rate of discharge. The ramp signal C is then compared with the varying D.C. signal B, and when the wheel speed of the land vehicle drops below the related vehicle land speed, represented by signal B dropping below the ramp signal C, a "slip" gate signal (D) is generated. The slip gate signal D is then coupled to one of the inputs of the brake control logic circuit 18.

The D.C. level detector and zero velocity gate circuit 16, in response to the variable D.C. signal B generated by the frequency converter 12, generates two output signals (G and H), each signal being clamped at a selected D.C. level of the input signal applied thereto, with such signals being respectively coupled to the deceleration differentiator circuit 20 and the acceleration differentiator circuit 22. Basically, the reason for detecting the preselected D.C. levels of the input signal B and developing output signals G and H, is to prevent any ripple characteristics of the signal applied thereto, which frequently occurs when the land vehicle is operated at low speeds, from being coupled into the deceleration and acceleration differentiator circuits 20, 22. The D.C. level detector and zero velocity gate circuit 16 develops a zero velocity gate signal (I) and couples this signal I to one input of the brake control logic circuit 18.

The deceleration differentiator 20 differentiates the variable D.C. signal G applied thereto and generates a pulse output signal (0) which signal 0 is coupled to the variable threshold deceleration gate circuit 24; while the acceleration differentiator 22 differentiates the variable D.C. signal H applied thereto and generates a pulse output signal (P) which signal P is coupled to the variable threshold acceleration gate circuit 26.

The variable threshold deceleration gate circuit 24 has a variable threshold feature which produces an output gate signal (K) having a "turn on" threshold at a different level than its "turn off" threshold. That is to say, the variable threshold deceleration gate circuit 24 "turns on" at a lower threshold than it "turns off" so as to provide a desirable fast "turn off" of the vehicles braking application relative to the rate of deceleration of the wheels of the land vehicle. The pulse output signal K developed by the variable threshold deceleration gate circuit 24 is present when the deceleration rate of change of the vehicle wheels exceeds a preset value and is coupled to one of the inputs of the brake control logic circuit 18 and to the acceleration programmed oscillator circuit 28.

The variable threshold acceleration gate circuit 26 is similar to the variable threshold deceleration gate circuit 24 but for the fact that it is responsive to the pulse output signal P developed by the acceleration differentiator 22, and generates a pulse output signal (Q) indicative of acceleration of the vehicle wheel speed above a preselected valve. The circuit also has a variable threshold feature in which the "turn on" of the circuit is at a lower threshold than the "turn off" feature of the circuit. The pulse output signal Q of the variable threshold acceleration gate circuit 26 is coupled to one of the inputs of the brake control logic 18, the accleration differentiator circuit 22 and the reset timer and gate circuit 28.

The acceleration programmed oscillator circuit 28 receives an analog signal (J) from the acceleration differentiator 22 which programs the oscillator so as to produce a sawtooth pulse output signal (L) that has a frequency proportional to the rate of acceleration of the vehicle wheels. This output sawtooth signal L is coupled to a fixed threshold variable duty cycle pulse generator 32.

The fixed threshold variable duty cycle pulse generator 32 is programmable from zero percent to 100 percent duty cycle with respect to the output signal developed thereby M. The output signal M of the fixed threshold variable duty cycle pulse generator 32 is coupled to one of the inputs of the brake control logic circuit 18.

The reset timer and gate circuit 30 is reset by one of the outputs of the brake control logic circuit 18 (T) and commences a reset timing cycle at the end of the reset time period which develops a reset gate signal (V) for controlling the application of the output pulse signal Q generated by the variable threshold acceleration gate circuit 26 (Q) and selectively couples this output pulse signal Q to one of the inputs of the brake control logic circuit 18.

DETAILED DESCRIPTION - FIG. 2

Figure 2:
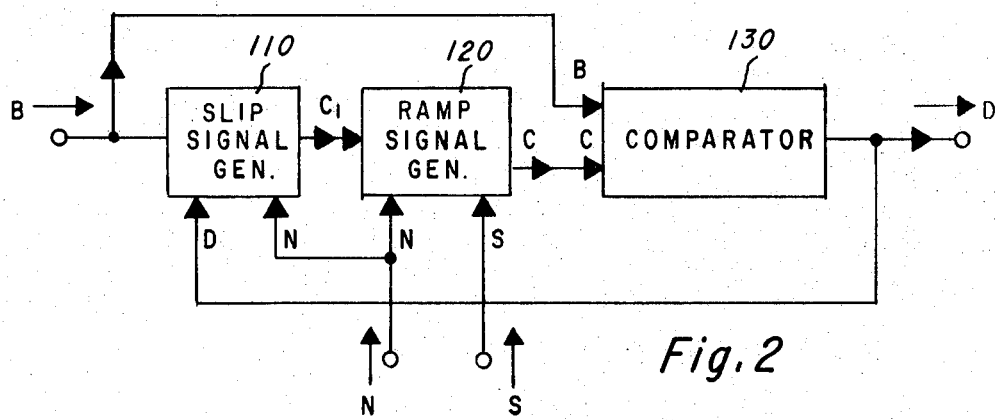
FIG. 2 is block diagram of a slip and ramp generator and comparator circuit comprising a slip signal generator, a ramp signal generator, and a comparator circuit.

Referring now to FIG. 2 there is depicted in block diagram form the functional block diagram of the slip and ramp generator and comparator circuit disclosed in this application. The circuit function embodied in FIG. 2 is particularly advantageous when utilized in the vehicle skid control braking system of FIG. 1. In such a braking system, a varying D.C. signal B indicative of wheel speed is coupled to a slip signal generator 110 which modifies signal B typically by offsetting the varying D.C. signal by a predetermined percentage or value to generate slip signal $C_1$. It is to be understood that signal B is representative of velocity of one or a plurality or an average of a plurality of wheels of the vehicle which are responsive to the braking system.

Ramp signal generator 120 is responsive to slip signal $C_1$ and generates a ramp signal C having a programmable constant current rate of discharge. Ramp generator 120 is selectively gated by signals N and S representing first and second conditions of the wheels of the vehicle. Signals N and S determine the particular rate of discharge of slip signal C to indicate vehicle land velocity, as opposed to vehicle wheel speed. Upon the first condition that the wheels are decelerating at a rate above a preselected value, as determined by the variable threshold deceleration gate circuit 24 in FIG. 1, ramp generator 120 is programmed into a "hold" condition, or state, and the slip signal C remains at a relatively constant value, representing a relatively constant land vehicle speed.

Upon the second condition of the wheels wherein the rate of deceleration of the wheel is less than the predetermined value determined by the deceleration differentiator circuit 20 depicted in FIG. 1 and the rate of acceleration is above a preselected value as determined by the variable threshold acceleration gate circuit 26 in FIG. 1, ramp generator 120 is programmed into the condition wherein slip signal C discharges at a first rate. The first rate typically is a relatively slow rate representative of a relatively slow deceleration of the vehicle land speed. Absent the above described two conditions, the ramp signal generator is programmed to provide signal C having a second rate of discharge. Typically, this second rate is relatively fast and is representative of a relatively fast decleration rate of the vehicle land speed.

Another ramp generator over which this invention is an improvement is discussed in detail in copending patent application Ser. No. 837,855 filed June 30, 1969, abandoned in favor of continuation application Ser. No. 229,345 filed Feb. 25, 1972.

As shown in FIG. 1, signals S and N are generated by the brake control logic circuit 18 in response to acceleration and deceleration rate detector circuits.

Comparator 130 is responsive to ramp signal C and to wheel speed signal B. Slip gate signal D is selectively generated upon the condition that the vehicle land speed is greater than the vehicle wheel speed, which preferably is represented by the voltage amplitude of ramp signal C exceeding the voltage amplitude of speed signal B. Output signal D is then coupled to brake control logic circuits to selectively effectuate inhibition of the vehicle's braking system, i.e., selective release of the brakes.

In the system depicted in FIG. 1, it is shown that the brakes are advantageously pumped while the vehicle is accelerating due to the release of the brakes effectuated by signal D. This second selective brake-release sequence is effectuated by other control signals. Signal D preferably is the dominant control for releasing the brakes when the vehicle's wheels are accelerating at too rapid a rate.

Ramp signal C discharging at a programmed rate of discharge according to acceleration and deceleration conditions of the wheels represents vehicle land speed without actually monitoring it. As the value of the signal at the moment discharge begins is correlated to wheel speed having substantially zero slip, the value also is indicative of land speed. It has been experimentally determined that discharging the value of the signal at the intital moment of discharge at one of two rates according to existing conditions of wheel velocity and rate of charge of wheel velocity closely approximates vehicle land speed.

Figure 3:
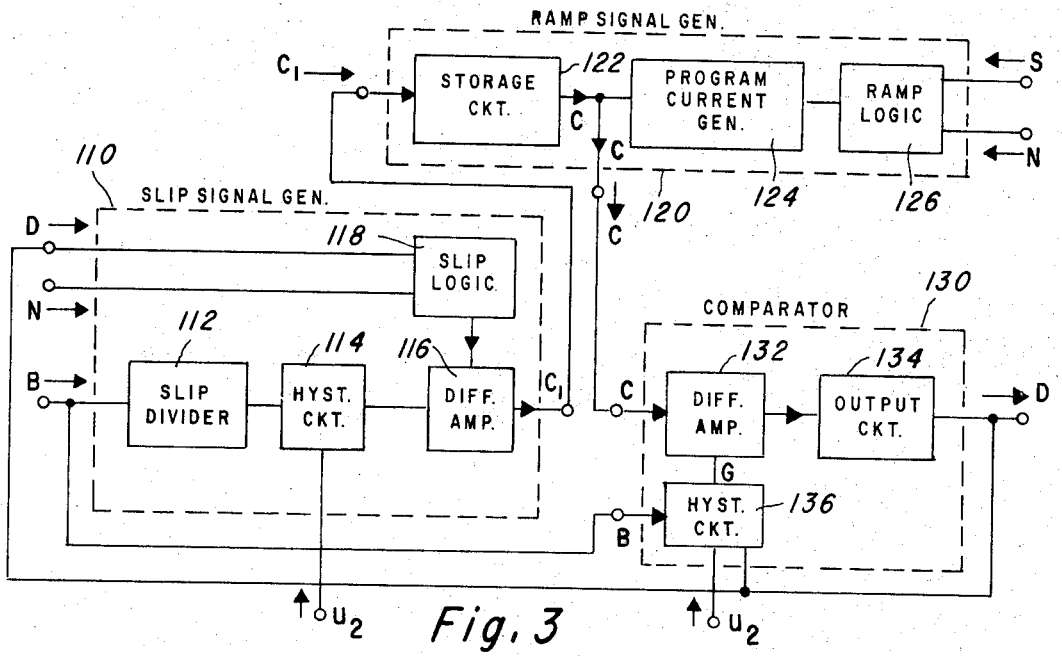
FIG. 3 represents a block diagram of the functional component of the slip signal generator, ramp signal generator, and comparator circuit of FIG. 2 in accordance with one embodiment of the present invention.

Referring now to FIG. 3, the slip signal generator 110 of FIG. 2 typically comprises a slip divider circuit 112 responsive to the varying D.C. signal B representative of wheel speed. Slip divider 112 modifies or offsets the varying D.C. signal B a preselected value. A hysteresis circuit 114 further selectively modifies the output signal from the slip divider 112 and couples it to the differential amplifier 116 which is selectively gated to produce slip signal $C_1$. A slip logic means 118 provides the selective gate signal to the differential amplifier means 116 according to the slip gate signal D and the ramp hold signal N. The hysteresis circuit 114 is selectively gated by reset signal U2, typically provided by a timing circuit whose output is indicative of a sufficiently long braking release cycle due to an output from the antiskid module. Such a timing circuit is suitably provided by the reset timer and gate circuit 30 depicted in FIG. 1 of the improved vehicle anti-skid control system referenced above.

The ramp signal generator for generating ramp signal C indicative of vehicle land speed, as opposed to vehicle wheel speed, typically comprises signal storage means 122 coupled to a programmable current generator means 124 which is selectively gated into appropriate operating conditions or states by ramp logic means 126. Ramp logic means 126 is responsive to the ramp hold signal N and to a slow ramp gating signal S, combinations of which signals selectively drive the programmable current generator means into the proper state. Typically, the state caused by slow ramp signal S provides a relatively low rate of discharge of the slip signal C indicative of a slow rate of deceleration of the vehicle land speed. Ramp hold signal N programs current generator 124 into the zero current state, preventing a discharge of the signal C. Absent signals A and N (or in their "off" logic state), the programmable current generator 124, is programmed into its typically highest current sinking state, allowing the relatively fastest rate of discharge of signal C, indicative of a relatively high vehicle land deceleration rate.

The comparator circuit 130 typically comprises a second differential amplifier means 132 responsive to slip signal C and coupled to second hysteresis circuit 136. Hysteresis circuit 136 is responsive to D.C. varying input signal B indicative of wheel speed and to the comparator 130 signal output D an is gated by the reset gating signal U2 above described. The output signal from the hysteresis circuit 136 is typically proportional to signal B but having a D.C. offset allowing a more responsive differential amplifier means 132 coupled thereto. Output circuit means 134 provides slip gate signal D indicative of a condition of the wheels wherein wheel speed is less than vehicle land speed. It is noted that the slip gate signal D is fed back to the slip logic means 118 of the slip signal generator 110 and to the hysteresis circuit 136 for providing selective voltage offset, or hysteresis, in signal G.

Figure 5:
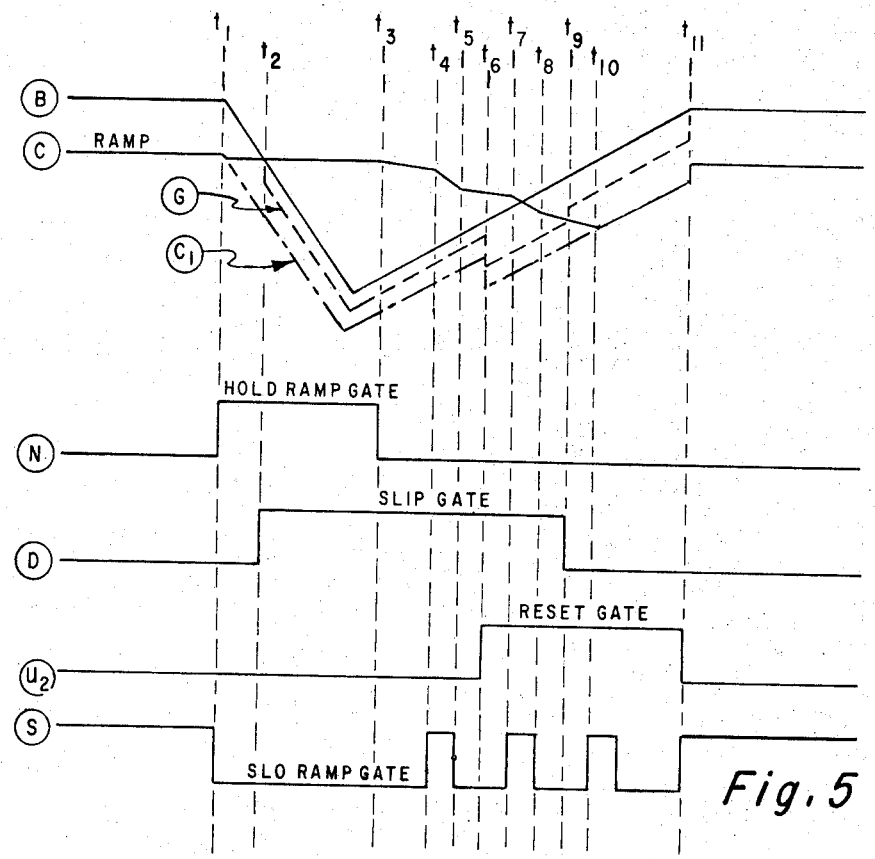
FIG. 5 graphically represents exemplary input and output waveforms illustrating one mode of operation of the slip and ramp generator and comparator circuit depicted in FIG. 4.

Operation of the functional block diagrams shown in FIGS. 2 and 3 is best understood when viewing the waveform diagrams shown in FIG. 5. A signal B indicative of vehicle wheel speed is shown as a D.C. signal having time intervals of varying amplitude and slope. Amplitude is indicative of vehicle wheel speed, and the slope is indicative of the rate of change of the vehicle wheel speed, i.e., acceleration or deceleration. When the output D of the comparator circuit 130 is "on" and the reset pulse U2 is present, the signal G derived from incoming signal B receives a D.C. offset according to hysteresis circuit 136. It is remembered that the slip gate output D is "on" when signal B, indicative of wheel speed, falls below the threshold established by the ramp signal C, indicative of vehicle land speed. Ramp signal C is generated from wheel speed signal B after being D.C. offset (indicative of wheel slippage) by slip divider 112, and selectively further D.C. offset to provide hysteresis thereto by hysteresis circuit 114. Differential amplifier 116 provides signal $C_1$ according to slip logic circuit 118 and signals D and N. The ramp hold signal N, generated by deceleration sensing circuits and logic circuits shown in FIG. 1, is indicative of a rate of deceleration exceeding a preselected value as established, for example, by the variable threshold deceleration gate circuit 24 in FIG. 1. When the rate of deceleration of the wheels exceeds a predetermined threshold value, N is "on" and is shown as a high pulse. The slow ramp gate signal S is also generated by deceleration and acceleration sensing circuits and is selectively "on" when the condition of the wheels is met that deceleration is below the selected value set by the variable threshold deceleration gate circuit 24 or acceleration is greater than a second selected value as typically established by the variable threshold acceleration gate circuit 26.

During the time interval $t_1 - t_2$ the vehicle is decelerating at a rapid rate due to application of the brakes by the operator of the vehicle. The rate of deceleration exceeds a preselected rate and the ramp signal N is on. At time $t_2$, the wheel speed decreases to less than the land speed, represented by the amplitude of B falling below the amplitude of C, and the output or slip gate signal D becomes "on". Signal D actuates hysteresis circuit 136 to provide voltage offset to signal G.

During time $t_2 - t_3$ vehicle wheel speed is shown still decelerating and then accelerating. The ramp hold gate signal N prevents any discharge of the ramp signal C, and C is shown as a constant value. The slip gate signal D remains "on" as B's amplitude remains less than the threshold level established by ramp signal C. Slow ramp signal S is "on" (a negative going pulse) as the deceleration rate has exceeded the first predetermined value, and wheel acceleration has exceeded a second predetermined value. Ramp hold signal N programs the current generator 124 to a zero current state causing the relatively zero rate of discharge of ramp signal C, indicating relatively zero land velocity deceleration.

At time $t_3$, ramp signal N turns "off", responding to the acceleration of the vehicle's wheels. Ramp logic means 126 programs the current generator 124 according to the "on" state of slow ramp gate S, and the ramp signal C discharges at a relatively slow rate. At time $t_4$, signal S turns "off" and the ramp logic circuit 126 programs the generator 124 into its fast discharge state, and signal C discharges in the relatively fast mode. It is understood that signal S is responsive to the repetitious actuation of the vehicle's brakes (or "pumping") produced by other circuits in the system. The "on" state of interval $t_3 - t_4$ may, for example, be provided due to the application of the vehicle's brakes while the vehicle is accelerating caused by another signal overriding signal D. The "off" condition in interval $t_4 - t_5$ may be due to the deactivation of the brakes (or the inhibiting of the braking action) by activation of the output of the anti-skid module by signal D or by a reset signal. At $t_6$, reset gate pulse U2 is shown turning "on". Hysteresis circuits 114 and 136 respond and input signal B is further D.C. offset. Preset gate signal U2 is responsive to the condition that the vehicle has decelerated for a sufficient length of time without activation of the anti-skid control system. Shown during $t_5 - t_7$ is the turning "on" of signal S which programs the current generator 124 into the slower mode of discharge, and ramp signal C accordingly exhibits less slope. Interval $t_7 - t_{10}$ exhibits an "off-on" condition of signal S causing a fast-slow response in the ramp signal C. At $t_9$, the input signal G to the differential amplifier 116 is shown crossing the voltage level established by ramp signal C. The differential amplifier 132 detects this condition and provides output signal D in the "off" state indicative of vehicle wheel speed greater than vehicle land speed.

Accordingly, at $t_9$ as output signal D turns "off," the hysteresis circuits 114 and 136 are inactivated, and part of the D.C. offset of the varying D.C. signal G is removed. Signal S remains "on" during $t_9 - t_{10}$, and the rate of discharge of signal C is the slower rate. At $t_{10}$, the signal S turns "off" allowing the ramp signal C to decrease until the voltage established by signal $C_1$ is reached. Thereafter, ramp signal C follows the signal $C_1$ proportional to wheel speed to the end of the reset gate cycle at $t_{11}$. The module is then reset and ready for a new brake-release-brake sequence.

Figure 4:
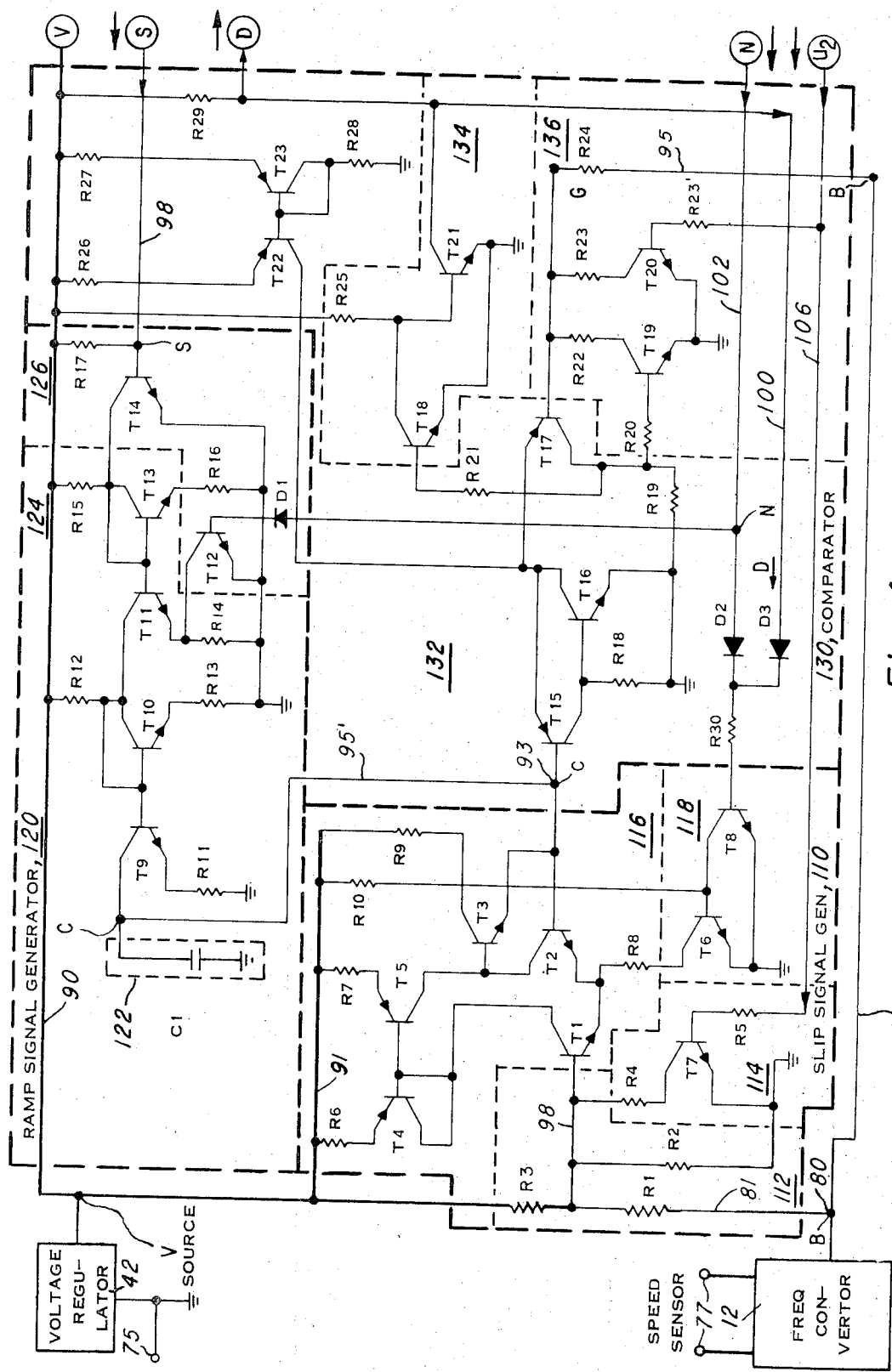
FIG. 4 represents a circuit schematic of the slip and ramp generator and comparator circuit depicted in block form in FIG. 3.

Referring to the particular circuit of FIG. 4 typifying the functional blocks of FIGS. 2 and 3, it is noted that signal C and $C_1$ are the same signal with a first part of signal $C_1$ comprising a first part of the duty cycle of the ramp signal C coupled to the differential amplifier 132 and the second part of $C_1$ is depicted as a dotted line to indicate that the differential amplifier 116 has been decoupled from storage circuit 122 by slip logic circuit 118 and ramp siganl C comprises the other party of the duty cycle. It is to be understood that such a combination of signals C and $C_1$ is not a crucial aspect of the invention, but is an advantageous feature of the invention.

Referring now to FIG. 4 and the particular circuit schematic comprising the functional blocks of FIGS. 2 and 3, the slip signal generator 110 receives the varying D.C. signal B via line 81 and the slip divider network 112 which includes divider resistors R1, R2, R3 and R4 for dividing down the varying D.C. signal B. The varying D.C. signal B is then coupled via line 98 to a differential amplifier which includes transistors T1 and T2. The differential amplifier transistors T1 and T2 have their collector terminals respectively connected to the collector terminals of current source transistors T4 and T5, which in turn have their emitter electrodes respectively coupled to the V source line 91 via emitter bias resistors R6 and R7, respectively, and their base terminals connected in common. The base terminal of current source transistor T4 is coupled back to the collector terminal thereof. The output of the differential amplifier (transistors T1 and T2) is taken from the collector terminal of transistor T2 through an output transistor T3 that has its collector terminal connected to the V source line 91 via load resistor R9 and its emitter terminal connected to the base terminal of transistor T2. The emitter terminals of the differentiator amplifier transistors T1 and T2 are connected in common and to the switching transistor T6 of the slip logic circuit 118 via emitter bias resistor R8. The switching transistor T6 has its emitter connected to ground and its base connected to the V source line 91 via base bias resistor R10. Coupled across the base and emitter of the switching transistor T6 is an invertor amplifier transistor T8 having its collector coupled to the base of the switching transistor T6, its emitter coupled to ground, and its base coupled to slip logic means 118 comprising the input diodes D2 and D3 via limiting resistor R30. When the ramp hold signal N is low, the invertor amplifier transistor T8 conducts heavily and drives the switching transistor T6 off, which in turn disables the slip signal generator 110, thus causing the signal storage means 122 in the ramp signal generator 120 to discharge rapidly through the discharge transistor T9 and the load resistor R11. Note that when the ramp logic signal N is high, the slip signal generator 110 inhibits the signal storage means 122 from discharging through the transistor T9, as shown by the ramp signal C of FIG. 3. A switching transistor T7 is included in the hysteresis circuit 114 which serves to reset the slip signal generator 110, and for providing hysteresis to the output signal G of the slip divider circuit 112. The switching transistor T7 has its collector connected to the V source line 98 via bridge resistor R4, its emitter connected to ground and its base connected through limiting resistor R5 and line 106 to the reset gating signal U2. Thus, when the reset timer signal U2 goes on it drives the base of the switching transistor T7 low and transistor T7 into its conductive state, which in turn changes the slip signal divider circuits R1, R2, R3, R4. That is to say, the divider resistor R4 of the divider circuit is coupled in parallel to divider resistor R2 for resetting the slip signal generator 110.

The ramp signal generator 120, in addition to the discharge transistor T9, includes the programmable current generator 124 having current source transistor T10, T11 and T13 for setting the current bias for the discharge transistor T9. The current source transistors T10 and T11 have their collectors connected in common and to the V source line 90 through the collector bias resistor R12, and their emitters respectively coupled to ground through emitter bias resistors R13 and R14. The base of the current source transistor T10 is coupled to the base of the discharge transistor T9, while the collector thereof is connected back to its base. The current source transistor T13 has its collector connected to the V source line 90 through the collector bias resistor R15, its emitter connected to ground through the emitter bias resistor R16 and its base connected to the base of the current source transistor T11. The collector of the current source transistor T13 is coupled back to its base. A logic transistor T12 in ramp logic means 126 is coupled across the emitter bias resistor R14 of the current source transistor T11. That is to say, the collector of transistor T12 is coupled to the emitter of transistor T11, the emitter of transistor T12 iss coupled to ground and its base is connected to the cathode of diode D1 which has its anode connected to the output of the ramp logic circuit via line 102. Logic means 126 further includes the logic transistor T14 which is coupled across the current source transistor T13. That is to say, the collector of the logic transistor T14 is connected to the collector of the current source transistor T13, the emitter of the logic transistor T14 is connected to ground, and the base of the logic transistor T14 is connected to the V source line 90 through base bias resistor R17 and to the ramp logic circuit via line 98. When the logic transistor T12 is on, the ramp signal generator 120 is in a hold condition. That is, the current source transistor T11 substantially draws all the current through the collector bias resistor R12 so the current through the discharge transistor T9 and the current source transistor T10 substantially approach zero or are each in a very low conductive state so as to prevent capacitor C1 comprising the signal storage current 122 from discharging through the discharge transistor T9. Therefore, when the ramp logic signal N is high, so as to forward bias the diode D1 and drive the logic transistor T12 into its high conductive state, the ramp signal C developed by the ramp signal generator 120 is substantially "flat" as shown during the time period $t_1 - t_3$. When the logic transistor T14 is in its high conductive state, it essentially connects the bases of the current source transistors T10 and T11 to ground. The current source transistor T11 draws substantially zero current upon this occurrence or is in its low conductive state. Consequently, the discharge transistor T9 and the current source transistor T10 are in their high conductive states and draw maximum current. This in effect allows the capacitor C1 to discharge at a high rate through the discharge transistor T9. Accordingly, when the ramp logic singal F is in its high state so as to drive the logic transistor T14 into its high conductive state, the ramp signal C generated by the ramp signal generator 120 rapidly "falls" as shown during time period $t_4 - t_6$.

The comparator 130 comprises a differential amplifier 132 including transistors T15, T16 and T17, output transistors T18, and T21, logic transistors T19 and T20 and current source transistors T22 and T23. The differentiator amplifier transistors T15 and T17 have their emitters connected in common to the collector of the differentiator amplifier transistor T16, which in turn are connected to the collector of the current source transistor T22. The collectors of the differentiator amplifier transistors T15 and T17 are respectively coupled to ground through collector bias resistors R18 and R19, while the emitter of the differentiator amplifier transistor T16 is coupled directly to ground. The current source transistors T22 and T23 have their emitters respectively coupled to the V source line 90 via emitter bias resistors R26 and R27, and their bases connected in common. The collector of current source transistor T23 is connected to ground through the collector bias resistor R28, and is coupled back to its base. The output transistor T18 has its collector connected to the V source line 90 through load resistor R25, its emitter connected to ground and its base connected to the collector of the differentiator amplifier transistor T17 through the limiting resistor R21. The output transistor T21 has its base connected to the collector of output transistor T18, its emitter connected to ground and its collector connected to the N source line 90 through load resistor R29. The output of the comparator circuit 130 is developed across the load resistor R29, and is coupled to the output logic circuit 18. The output transistor T19 has its collector connected to the base of the differentiator amplifier transistor T17 through limiting resistor R22, its base connected to the collector of transistor T17 through limiting resistor R20 and its emitter connected to ground. Connected across the output transistor T19 and limiting resistor R22 is the logic transistor T20 and limiting resistor R23, wherein the collector thereof is connected to the base of transistor T17 through limiting resistor R23, the emitter is grounded and the base connected to the reset gating signal U2 via limiting resistor R23' and line 106. The two inputs to the comparator circuit 130 are received at terminal 93 via line 95' (ramp signal C) and via line 95 and limiting resistor R24 (varying D.C. signal G derived from signal B). The output signal D of the comparator circuit 130 is also coupled back to the invertor amplifier transistor T8 via line 100, diode D3 and limiting resistor R30. Resistors R22, R23 and R24 make up a current divider circuit in the comparator circuit 130. That is to say, when the reset signal U2 drives the logic transistor T20 into its high conductive state, the logic transistor T20 changes the current divider R22, R23, R24.

Although specific embodiments of this invention have been described herein in conjunction with slip and ramp generator and comparator circuits, which are advantageously utilized in the vehicle skid control braking system, above described, various circuit modifications will be apparent to those skilled in the art in providing the means herein described without departing from the scope of the invention. Furthermore, other conditions besides wheel speed and land speed of a moving vehicle may be represented and utilized according to the spirit of the invention.

What is claimed is:

1. In a vehicle skid control braking system of the type that selectively controls the engagement and disengagement of the braking system of a vehicle in accordance with selected braking conditions, a slip and ramp generator and comparator circuit for providing a signal which selectively activates a brake control means to inhibit vehicle braking action comprising in combination:

slip signal means responsive to a first signal representing the wheel speed of the vehicle for selectively generating a slip signal proportional to said first signal;
ramp signal means responsive to said slip signal for selectively generating a ramp signal representing vehicle land speed, said ramp signal means comprising signal storage means for selectively storing said slip signal, and charge control means responsive to a ramp hold signal indicative of a first condition of the wheels wherein vehicle wheel deceleration rate is greater than a preselected value for selectively discharging said signal storage means at controlled rates when said deceleration rate is less than said preselected value and for selectively inhibiting discharge of said signal storage means when said deceleration rate exceeds said preselected value, said ramp signal means being further responsive to a slow ramp signal representing a second condition of the wheels wherein vehicle wheel deceleration rate is less than said preselected value for discharging said signal storage means at a first controlled rate, whereby said charge control means inhibits discharge of said storage means in response to said ramp hold signal, discharges said storage means at a first controlled rate responsive to said slow ramp signal, and discharges said storage means at a second controlled rate in the absence of said ramp hold and slow ramp signals; and comparator means responsive to said first signal and to said ramp signal for generating a slip gate signal indicative of a predetermined relationship between vehicle wheel speed and vehicle land speed and effective to activate said brake control means for inhibiting vehicle braking.

2. The slip and ramp generator and comparator circuit of claim 1 wherein said second condition of the wheels corresponds to a vehicle land deceleration rate below a selected value.

3. The slip and ramp generator and comparator circuit of claim 1 wherein said charge control means comprises:

a. programmable current generator means responsive to said ramp hold signal and to said slow ramp signal for providing said controlled rates of discharge; and b. ramp logic means selectively coupling said slow ramp signal and said ramp hold signal to said current generator means for dynamically programming said current generator means into states providing said controlled rates.

4. The slip and ramp generator and comparator circuit of claim 3 wherein said comparator means comprises:

a. first hysteresis circuit means responsive to said first signal for providing a first hysteresis signal proportional to said first signal; and b. differential amplifier means responsive to said first hysteresis signal and to said ramp signal for comparing said signals and selectively generating said slip gate signal.

5. The slip and ramp generator and comparator circuit of claim 4 wherein said slip signal means comprises:

a. slip logic means responsive to said slip gate signal and responsive to said ramp hold signal for selectively providing a logic signal; and b. second differential amplifier means responsive to said first signal and to said logic signal for selectively providing said slip signal, wherein said slip logic means selectively biases said second differential amplifier means for electrically decoupling said slip signal from said signal storage means.

6. The slip and ramp generator and comparator circuit of claim 5 wherein said second differential amplifier means of said slip signal means includes:

a. voltage divider means responsive to said first signal for providing a divider signal porportional to said first signal; and b. second hysteresis circuit means coupling said divider signal to said second differential amplifier means for selectively biasing said divider signal.

7. The slip and ramp generator and comparator circuit of claim 6 wherein said signal storage means comprises a capacitor.

* * * * *